United States Patent
Ahn et al.

(10) Patent No.: US 8,300,600 B2
(45) Date of Patent: Oct. 30, 2012

(54) SYSTEM AND METHOD FOR RELEASING QUALITY OF SERVICE RESOURCES IN MOBILE COMMUNICATION NETWORK

(75) Inventors: Ho Seung Ahn, Seoul (KR); Yun Geun Kwag, Seongnam-si (KR); Seok Joon Jang, Seoul (KR)

(73) Assignees: Pantech Co., Ltd., Seoul (KR); Pantech & Curitel Communications, Inc., Seoul (KR)

( * ) Notice: Subject to any disclaimer, the term of this patent is extended or adjusted under 35 U.S.C. 154(b) by 687 days.

(21) Appl. No.: 12/437,006

(22) Filed: May 7, 2009

(65) Prior Publication Data

US 2009/0279510 A1 Nov. 12, 2009

(30) Foreign Application Priority Data

May 8, 2008 (KR) .................... 10-2008-0042965

(51) Int. Cl.
*H04W 4/00* (2009.01)
*H04W 36/00* (2009.01)
*H04L 12/66* (2006.01)
(52) U.S. Cl. .................. 370/331; 370/354; 455/436
(58) Field of Classification Search .......... 370/331–334, 370/352–356; 455/436–444
See application file for complete search history.

(56) References Cited

U.S. PATENT DOCUMENTS

| | | | |
|---|---|---|---|
| 2004/0028036 A1* | 2/2004 | Mose et al. | 370/353 |
| 2004/0156338 A1* | 8/2004 | Pasanen et al. | 370/331 |
| 2005/0021770 A1* | 1/2005 | Helm et al. | 709/228 |
| 2007/0155376 A1* | 7/2007 | Payyappilly et al. | 455/422.1 |
| 2007/0223421 A1* | 9/2007 | Zafer et al. | 370/331 |

FOREIGN PATENT DOCUMENTS

WO   WO 2008/060119   *  5/2008

* cited by examiner

*Primary Examiner* — Ronald Abelson
(74) *Attorney, Agent, or Firm* — H.C. Park & Associates, PLC

(57) ABSTRACT

A system and a method for releasing quality of service (QoS) resources in a mobile communication network enable QoS resources allocated to a mobile terminal to be released, if, after the mobile terminal is allocated with resources for QoS through an Evolution-Data Optimized (EVDO) Revision A (rA) network to receive data serves, the mobile terminal escapes from the EVDO rA network without first performing a resource release request to the EVDO rA network. The system and method may be implemented in the mobile terminal, the access network, the text message server, or any combination thereof, for releasing the allocated QoS resources without requiring the mobile terminal to re-connect to the EVDO rA network.

19 Claims, 4 Drawing Sheets

US 8,300,600 B2

SYSTEM AND METHOD FOR RELEASING QUALITY OF SERVICE RESOURCES IN MOBILE COMMUNICATION NETWORK

CROSS-REFERENCE TO RELATED APPLICATION

This application claims priority from and the benefit of Korean Patent Application No. 10-2008-0042965, filed on May 8, 2008, which is hereby incorporated by reference for all purposes as if fully set forth herein.

BACKGROUND OF THE INVENTION

1. Field of the Invention

This invention relates to a system and a method for releasing quality of service (QoS) resources in a mobile communication network, and more particularly, to a system and a method for releasing QoS resources allocated to a mobile terminal where the mobile terminal escapes from an Evolution-Data Optimized (EVDO) Revision A (rA) network after receiving QoS resources through the EVDO rA network.

2. Discussion of the Background

A mobile communication network, such as an EVDO network, in a code division multiple access (CDMA) EVDO type, provides quality of service (QoS) services to provide transmission quality for multimedia data such as an video phone service and a video streaming service or of large-size file downloads. Recently, QoS service has been implemented in an EVDO rA network.

The QoS service may provide improved data transmission quality by allocating resources for a wired/wireless network between a Packet Data Serving Node (PDSN) and a mobile terminal. For this, the mobile terminal requests a wired/wireless resource allocation for the QoS from an EVDO rA network, and the EVDO rA network allocates the corresponding QoS resources.

For the QoS resources to be released from the mobile terminal, the mobile terminal may perform a resource release request to the EVDO rA network while connected to the EVDO rA network. If the mobile terminal escapes from a service coverage area of the EVDO rA network before the mobile terminal performs a resource release request to the EVDO rA network, a connection with the EVDO rA network is cut.

However, if a connection with the EVDO rA network is cut before a resource release request to the EVDO rA network is performed, the QoS resources allocated to the mobile terminal are not released or returned to an idle state, and they are maintained in a busy state. Thus, these QoS resources may not be allocated to another mobile terminal requesting data services, and may be wasted.

If the mobile terminal that escaped from the service coverage area of the EVDO rA network without performing a resource release request later returns to the service coverage area of the EVDO rA network, the EVDO rA network may demand the return of the QoS resources allocated to the corresponding mobile terminal, receive a resource release request from the corresponding mobile terminal, and release the QoS resources.

However, the mobile terminal may not return to the EVDO rA network to release the resources, or the return may occur only after an extended period of time has passed. In these circumstances, maintaining the QoS resources in the busy state for the mobile terminal whose return status is unknown may decrease efficient use of the QoS resources.

SUMMARY OF THE INVENTION

This invention provides a system and a method for releasing QoS resources in a mobile communication network, where when a terminal allocated with QoS resources through an EVDO rA network escapes from the EVDO rA network, the mobile terminal may request release of the QoS resources from a PDSN through a CDMA 1x network instead of through the EVDO rA network. The QoS resources allocated to the terminal that escapes from the EVDO rA network may be thereby released without the mobile terminal having to re-enter the EVDO rA network.

This invention also provides a system and a method for releasing QoS resources in a mobile communication network, where a terminal allocated with QoS resources through an EVDO rA network escapes from the EVDO rA network, connects to a PDSN through a CDMA 1x network, and requests release of the resources allocated from the EVDO rA network from the connected PDSN, thereby releasing the QoS resources allocated to the terminal that escapes from the EVDO rA network.

This invention also provides a system and a method for releasing QoS resources in a mobile communication network, where a terminal allocated with QoS resources through an EVDO rA network escapes from the EVDO rA network, and an access network (AN) in the EVDO rA network monitors the use of the allocated QoS resources, and requests release of QoS resources allocated to the terminal that escapes from the EVDO rA network, from a PDSN.

Additional features of the invention will be set forth in the description which follows, and in part will be apparent from the description, or may be learned by practice of the invention.

The present invention discloses a system for releasing QoS resources in a mobile communication network, including: a Packet Data Serving Node (PDSN) to allocate QoS resources to a mobile terminal after setting a session connection to the mobile terminal through a first network, and a text message server to receive a text message from the mobile terminal through a second network, the text message for requesting release of the QoS resources after the mobile terminal has escaped the first network, and to transmit QoS resource release information included in the text message to the PDSN. Further, the PDSN releases the QoS resource allocated to the mobile terminal through the first network on the basis of the QoS resource release information received from the text message server.

The present invention also discloses a system for releasing QoS resources in a mobile communication network, including: a Packet Data Serving Node (PDSN) to allocate QoS resources to a mobile terminal after setting a first session connection to the mobile terminal through a first network, and the mobile terminal to request a second session connection to the PDSN through a second network, and to transmit QoS resource release information to the PDSN via the second network to request release of the allocated QoS resources. Further, when the PDSN receives the QoS resource release information from the mobile terminal while performing the second session connection through the second network, the PDSN releases the QoS resources allocated to the mobile terminal through the first network.

The present invention also discloses system for releasing QoS resources in a mobile communication network, including: a Packet Data Serving Node (PDSN) to allocate QoS resources to a mobile terminal after setting a session connection to the mobile terminal through a first network; and an access network (AN) in the first network to check whether the QoS resources allocated to the mobile terminal are used, and if the QoS resources are not used for a first predetermined time, to request a connection release to the mobile terminal, to determine that the mobile terminal has moved from the first network if a response is not received in a second predetermined time, and to transmit QoS resource release information to the PDSN to request release of the QoS resources allocated to the mobile terminal. Further, if the PDSN receives the QoS resource release information from the AN, the PDSN releases the QoS resources allocated to the mobile terminal through the first network.

The present invention also discloses a method for releasing QoS resources in a mobile communication network, including: receiving a request for a session connection at a Packet Data Serving Node (PDSN) through a first network for data services, setting the session connection to a mobile terminal, and allocating QoS resources to the mobile terminal from the PDSN; receiving a text message at a text message server to request release of the allocated QoS resources, the text message sent by the mobile terminal through a second network if the mobile terminal escapes from the first network; at the text message server, extracting QoS resource release information from the text message, and transmitting the extracted QoS resource release information to the PDSN; and at the PDSN, releasing the QoS resources allocated to the mobile terminal through the first network.

The present invention also discloses a method for releasing QoS resources in a mobile communication network, including: connecting to a first network, requesting a first session connection to a Packet Data Serving Node (PDSN) through the first network to receive data services, and receiving QoS resources allocated to a mobile terminal from the PDSN through the first network; if the mobile terminal escapes from the first network, requesting a second session connection to the PDSN through a second network to receive the data services through the second network, and providing QoS resource release information for requesting release of the QoS resources allocated to the mobile terminal in a session negotiation message and transmitting the session negotiation message to the PDSN through the second network. Further, the PDSN releases the QoS resources allocated to the mobile terminal upon receiving the QoS resource release information.

The present invention also discloses a method for releasing QoS resources in a mobile communication network, including: receiving a session connection request at a Packet Data Serving Node (PDSN) through a first network, allocating QoS resources to a mobile terminal by the PDSN, checking whether the QoS resources allocated to the mobile terminal are used, if the QoS resources are not used for a first predetermined time, requesting a connection release to the mobile terminal, if a response to the connection release request is not received from the mobile terminal within a second predetermined time, determining that the mobile terminal has escaped from the first network, requesting the PDSN to release the QoS resources allocated to the mobile terminal through the first network by an access network (AN) of the first network, and releasing the QoS resources allocated to the mobile terminal through the first network.

The present invention also discloses a method for releasing quality of service (QoS) resources by a mobile terminal, including requesting a session connection to a Packet Data Serving Node (PDSN) through a first network, receiving allocated QoS resources from the PDSN, and if the mobile terminal escapes from the first network and connects to a second network, transmitting a text message for requesting a release of the allocated QoS resources to a text message server through the second network, the text message comprising QoS resource release information. Further, the PDSN releases the QoS resources allocated to the mobile terminal through the first network upon receiving the QoS resource release information included in the text message.

The present invention also discloses a method for releasing quality of service (QoS) resources by a mobile terminal, including receiving a request for a first session connection to a Packet Data Serving Node (PDSN) from a mobile terminal through a first network, allocating QoS resources to the mobile terminal by the PDSN, receiving a request for a second session connection to a Packet Data Serving Node (PDSN) and a session negotiation message comprising QoS resource release information for requesting release of the QoS resources allocated to the mobile terminal, the request for the second session connection and the session negotiation message received by the PDSN through a second network, and releasing the QoS resources allocated to the mobile terminal upon receiving the QoS resource release information while performing the second session connection to the mobile terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
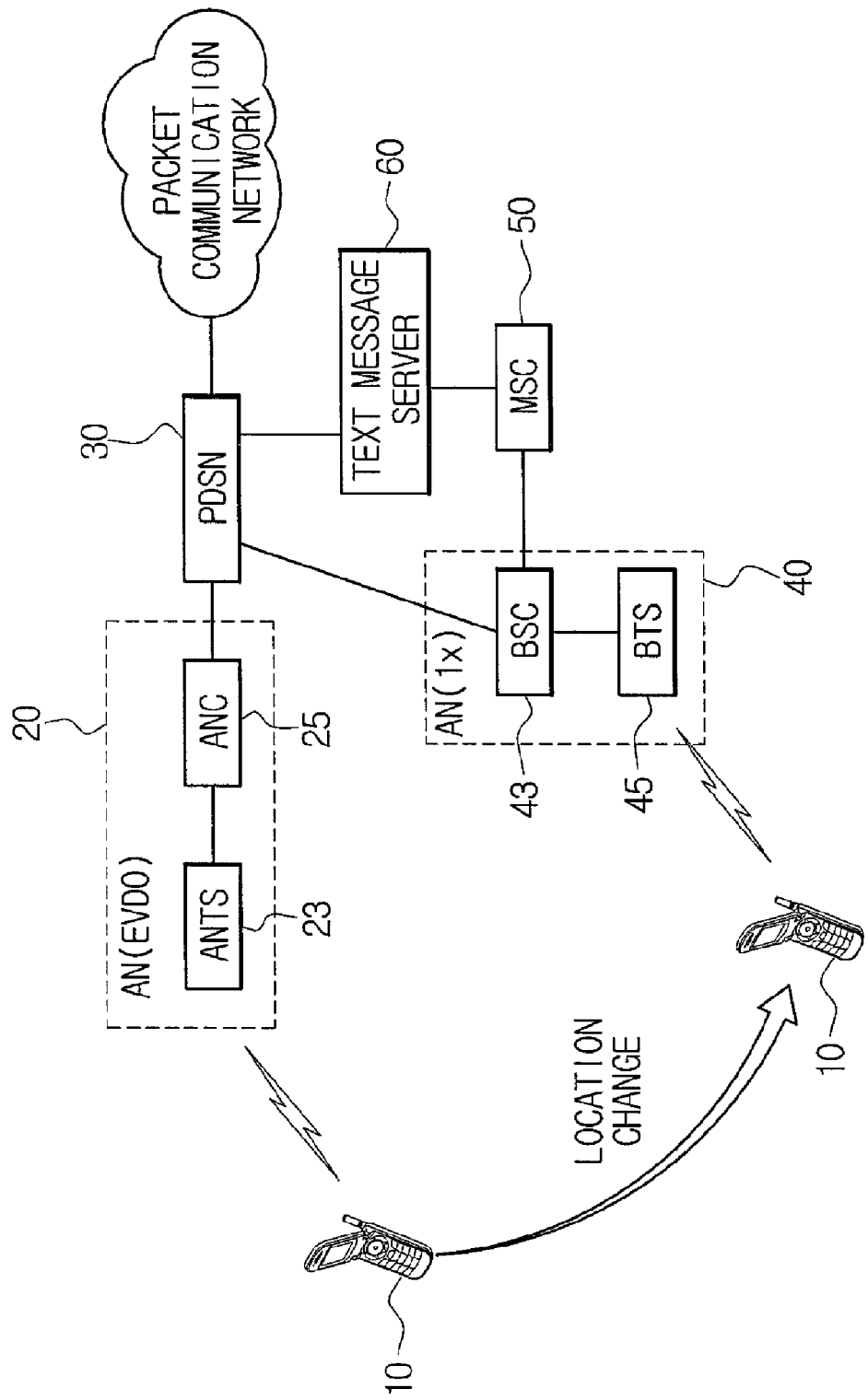
FIG. 1 is a view illustrating a configuration of a system for releasing quality of service (QoS) resources in a mobile communication network according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to limit this disclosure. As used herein, the singular forms "a", "an"

and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a view illustrating a configuration of a system for releasing quality of service (QoS) resources in a mobile communication network according to an exemplary embodiment of the present invention.

Referring to FIG. 1, a mobile terminal 10 provides a high speed data service through a first network, such as an EVDO rA network, and provides voice and data services through a second network, such as a CDMA 1x network.

If the mobile terminal 10 is to receive a data service while connecting to the EVDO rA network, after requesting a Point-to-Point Protocol (PPP) session establishment from a PDSN 30 through an Access Network Transceiver Subsystem (ANTS) 23 and an Access Network Controller (ANC) 25 and establishing a PPP session with the PDSN 30, the mobile terminal 10 is allocated with QoS resources from the PDSN 30.

If the mobile terminal 10, having been allocated with QoS resources from PDSN 30 through the EVDO rA network, escapes from the EVDO rA network coverage area, it may then connect to a second network, such as the CDMA 1x network. In this case, if the mobile terminal 10 cuts a connection with the EVDO rA network before a QoS resource release request to the EVDO rA network is performed, the QoS resources allocated to the mobile terminal by the PDSN 30 are not released or returned to an idle state, and they are maintained in a busy state. In this case, the mobile terminal 10 generates and sends a text message for requesting release of the QoS resources to a text message server 60 through the CDMA 1x network, which is the currently connected network.

The text message includes QoS resource release information for the release of the QoS resources. The QoS resource release information may include flow profile ID, 5-tuple (transmission/reception address, transmission/reception port, next header protocol such as Transmission Control Protocol (TCP), User Datagram Protocol (UDP) and Certificate Management Protocol (CMP)).

In addition, if the mobile terminal 10 escapes from the EVDO rA network and connects to the CDMA 1x network, in order to receive data service through the CDMA 1x network, the mobile terminal 10 requests a PPP session establishment from the PDSN 30 and establishes the PPP session with the PDSN 30 through the CDMA 1x network. For the mobile terminal 10 to return the QoS resources allocated through the EVDO rA network, the mobile terminal 10 allows a session establishment message tranceived to set the PPP session with the PDSN 30 to include the QoS resource release information for requesting release of QoS resources and transmits the information to the PDSN 30 through the CDMA 1x network.

A base station transceiver system (BTS) 45 is a network terminal device that is wirelessly connected to the mobile terminal 10, and provides voice and data services to the mobile terminal 10.

A base station controller (BSC) 43 operates and performs maintenance on the BTS 45, performs functions for wireless call processing such as a handoff, and controls a mobile communication service of the BTS 45. Specifically, if a signal received from the BTS 45 is a voice signal, the BSC 43 transmits the received voice signal to a mobile switching center (MSC) 50, and if the signal received from the BTS 45 is a data signal, the BSC 43 transmits the received data signal to the PDSN 30.

The BTS 45 and the BSC 43 described above are collectively part of an access network (AN) 40 of the CDMA 1x network.

The ANTS 23 transmits packet data to the mobile terminal 10, and the ANC 25 performs data transmission between the ANTS 23 and the PDSN 30.

In the EVDO rA network, the ANTS 23 and the ANC 25 are collectively part of an AN 20 of the EVDO rA network. The AN 20 of the EVDO rA network checks whether the QoS resources allocated to the mobile terminal 10 through the EVDO rA network are used. When the QoS resources allocated to the mobile terminal 10 are not used for a first predetermined time, the AN 20 requests a disconnection to the mobile terminal 10. If there is no response to the AN 20 from the mobile terminal 10 for a second predetermined time, the AN 20 may determine that the mobile terminal 10 has escaped from the EVDO rA network, and requests release of the QoS resources allocated to the mobile terminal 10.

As described above, if the AN 20 requests the release of the QoS resources from the PDSN 30, the AN 20 transmits the QoS resource release information to the PDSN 30.

The MSC 50 connects a number of BSCs 43 to another MSC (not shown) or a public switched telephone network (PSTN), and provides a connection route of a voice call for a communication call from the mobile terminal 10.

When the text message server 60 receives a text message from the mobile terminal 10 through the CDMA 1x network, the text message server 60 analyzes the type of the message included in a header of the received text message, and checks whether the text message is a message for requesting release of QoS resources. If the text message server 60 determines that the received message is the message for requesting release of QoS resources, the text message server 60 extracts the QoS resources release information included in the message for requesting release of QoS resources, and transmits the QoS resources release information to PDSN 30.

The text message server 60 described above may be implemented as a Short Message Service Center (SMSC), a Multimedia Messaging Service Center (MMSC), or the like.

The PDSN 30 connects the packet data transmitted through the BSC 43 or the AN 20 to a packet communication network by using an Internet Protocol (IP) or the like.

The PDSN 30 establishes the PPP session with the mobile terminal 10 through either the EVDO rA network or through the CDMA 1x network to provide the data service according to a request of the mobile terminal 10, and allocates QoS resources to provide transmission quality.

As described above, if the text message server 60, the mobile terminal 10, or the AN 20 requests the release of the QoS resources allocated to the mobile terminal 10, the PDSN 30 releases the QoS resources that were allocated to the mobile terminal 10 as idle resources in response to the QoS resource release request. This may occur before the QoS resources allocated to the mobile terminal 10 would have been released according to the conventional QoS resource release procedures, such as those described above.

The PDSN 30 searches for and deletes the QoS resources that are requested to be released from a reservation table for managing QoS resources allocated to each mobile terminal for data services. By deleting the QoS resources from the reservation table for managing QoS resources, the PDSN 30 releases the QoS resources as idle resources.

Figure 2:
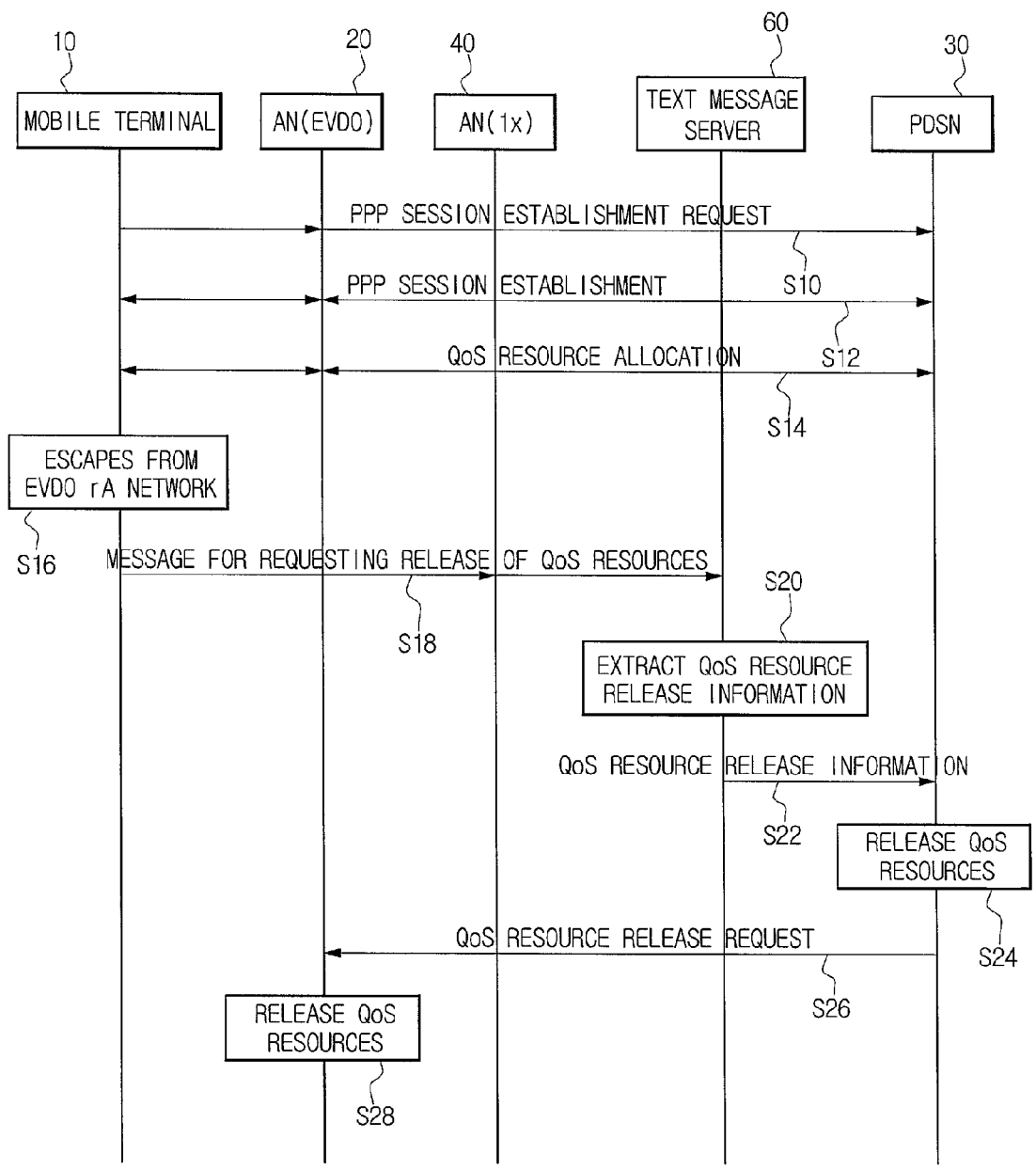
FIG. 2 is a diagram of a method for releasing QoS resources in a mobile network according to an exemplary embodiment of the present invention.

FIG. 2 is a diagram of a method for releasing QoS resources in a mobile network according to an exemplary embodiment of the present invention.

For the mobile terminal 10 connected to the EVDO rA network to receive the data service, the mobile terminal 10 requests a PPP session establishment to the PDSN 30 through the AN 20 in the EVDO rA network and establishes the PPP session with the PDSN 30, and is allocated with QoS resources for providing the transmission quality from the PDSN 30 (S10, S12, S14).

The PDSN 30 allocates the QoS resources in S14 in a reservation table, and registers and manages the allocated QoS resources.

If the mobile terminal 10 escapes from the EVDO rA network and connects to the CDMA 1x network (S16), as it moves while receiving the data service by using the QoS resources allocated from the PDSN 30 through the AN 20 in the EVDO rA network, the mobile terminal 10 generates a text message for requesting release of QoS resources. The text message for requesting release of QoS resources requests release of QoS resources allocated from the PDSN 30 through the EVDO rA network, and is transmitted to the text message server 60 through the AN 40 of the CDMA 1x network (S18).

The text message server 60, which receives the text message for requesting release of QoS resources from the mobile terminal 10 in S18, extracts QoS resource release information included in the text message for requesting release of QoS resources (S20), and transmits the extracted QoS resource release information to PDSN 30 (S22).

The PDSN 30, which receives the QoS resource release information from the text message server 60 in S22, releases the QoS resources on the basis of the QoS resource release information (S24).

In S24, the PDSN 30 releases the QoS resources as idle resources through an operation of searching for and deleting the QoS resources requested to be released from the reservation table, on the basis of the QoS resource release information, such as flow profile ID, 5-tuple, and the like.

The PDSN 30, which releases the QoS resources requested to be released in S24, requests release of the QoS resources to the AN 20 in the EVDO rA network (S26).

The AN 20 in the EVDO rA network, which is requested to release the resources in S26, releases the QoS resources allocated in S14 in response to the resource release request (S28).

Figure 3:
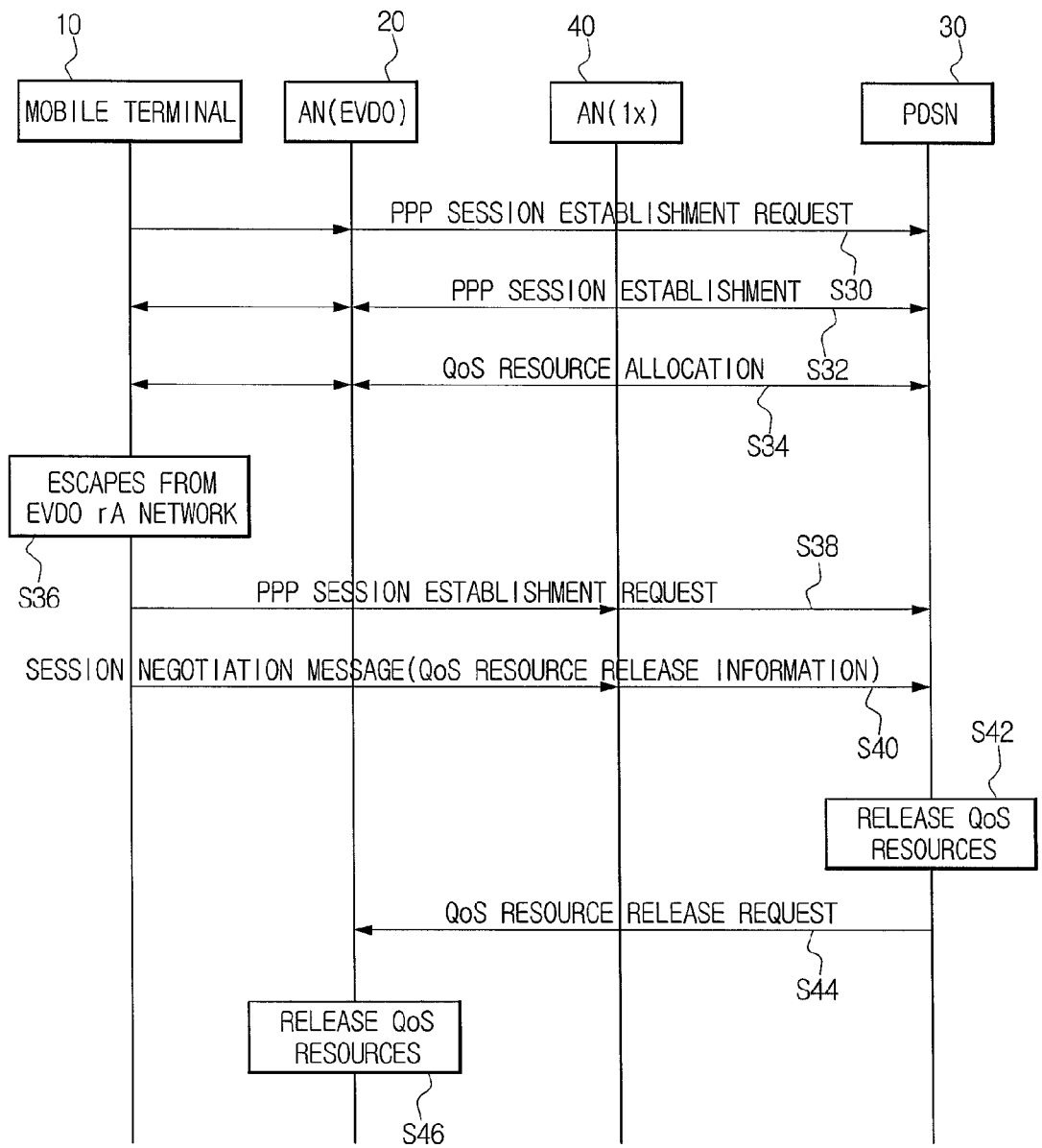
FIG. 3 is a diagram of a method for releasing QoS resources in a mobile network according to an exemplary embodiment of the present invention.

FIG. 3 is a diagram of a method for releasing QoS resources in a mobile network according to an exemplary embodiment of the present invention.

The mobile terminal 10, which is connected to the EVDO rA network, requests a PPP session establishment to the PDSN 30 through the AN 20 in the EVDO rA network, establishes the PPP session with the PDSN 30 to receive a data service, and is allocated with the QoS resources for providing transmission quality from the PDSN 30 (S30, S32, S34).

If the mobile terminal 10 escapes from the EVDO rA network and connects to the CDMA 1x network (S36), as it moves while receiving the data service by using the QoS resources allocated from the PDSN 30 through the AN 20 in the EVDO rA network, the mobile terminal 10 requests a PPP session establishment to the PDSN 30 to receive the data service through the CDMA 1x network. The mobile terminal 10 also transmits a session negotiation message. The session negotiation message is sent to the PDSN 30 through the AN 40 of the CDMA 1x network and includes QoS resource release information for requesting release of the QoS resources to PDSN 30, while establishing the PPP session with the PDSN 30 (S38 and S40).

The PDSN 30, which receives the QoS resource release information from the mobile terminal 10 in S40, releases the QoS resources on the basis of the QoS resource release information (S42).

The PSDN 30, which releases the QoS resources requested to be released in S42, requests release of the QoS resources to the AN 20 in the EVDO rA network (S44).

The AN 20 in the EVDO rA network, which is requested to release the resources in S44, releases the QoS resources allocated in S34 in response to the QoS resource release request (S46).

Figure 4:
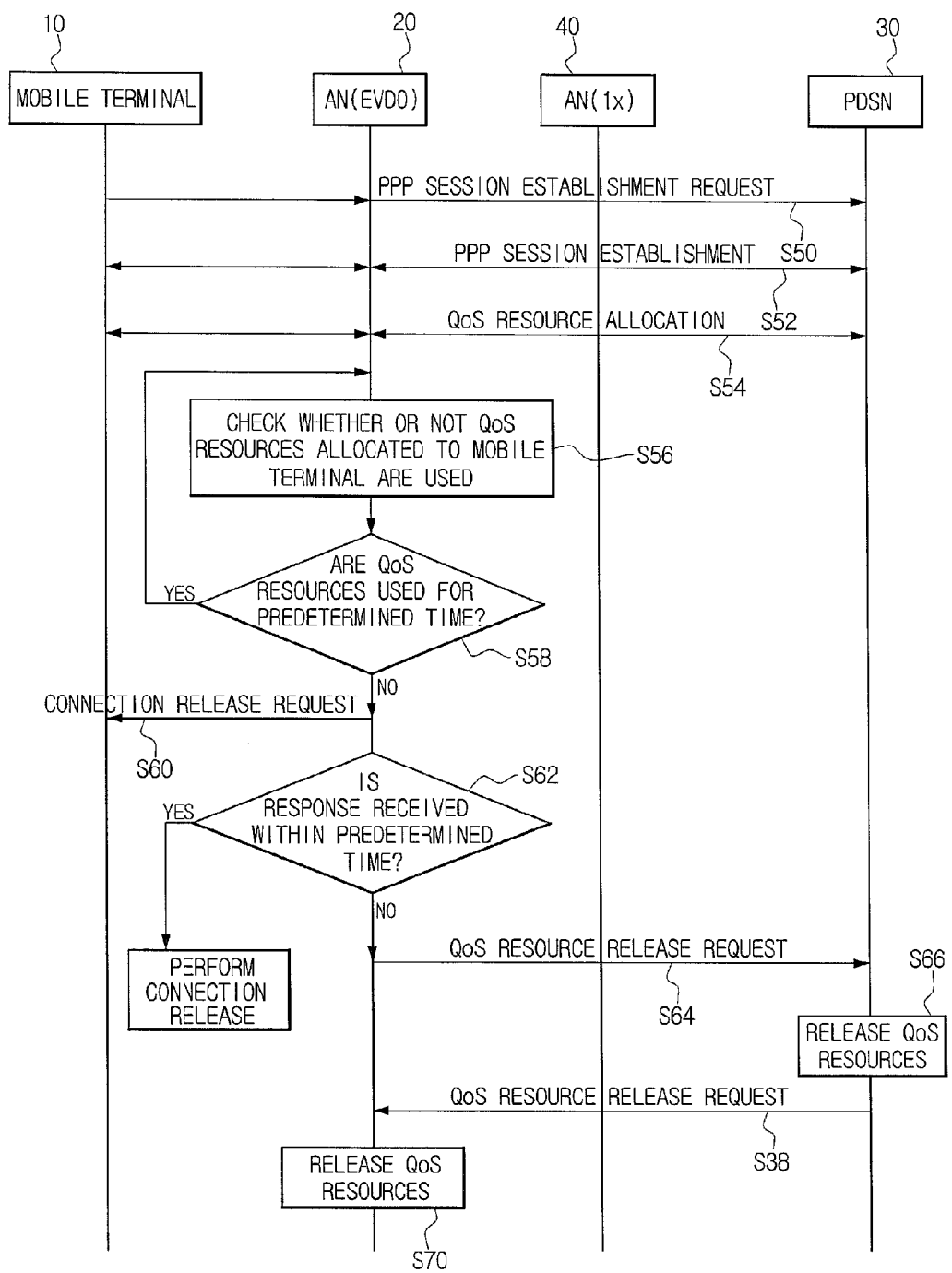
FIG. 4 is a diagram illustrating a method for releasing QoS resources in a mobile network according to an exemplary embodiment of the present invention.

FIG. 4 is a diagram illustrating a method for releasing QoS resources in a mobile network according to an exemplary embodiment of the present invention.

The mobile terminal 10, which is connected to the EVDO rA network, requests a PPP session establishment to the PDSN 30 through the AN 20 in the EVDO rA network, establishes the PPP session with the PDSN 30 to receive a data service, and is allocated with the QoS resources for providing transmission quality from the PDSN 30 (S50, S52, S54).

Thereafter, the AN 20 in the EVDO rA network checks whether the QoS resources allocated to the mobile terminal 10 in S54 are used (S56). If the QoS resources allocated to the mobile terminal 10 are not used for a first predetermined time, the AN 20 requests a disconnection to the mobile terminal 10 (S58 and S60). If there is no response from the mobile terminal 10 for a second predetermined time after the disconnection request is sent from the AN 20, the AN 20 determines that the mobile terminal 10 has escaped from the EVDO rA network, and requests release of the QoS resources allocated to the mobile terminal 10, to the PDSN 30 (S62 and S64). The second predetermined time described above may be the same or different as the first predetermined time.

The PDSN 30, which receives the QoS resource release information from the AN 20 in the EVDO rA network in S64, releases the QoS resources on the basis of the QoS resource release information (S66).

The PDSN 30, which releases the QoS resources requested to be released in S66, requests the release of the QoS resources to the AN 20 in the EVDO rA network (S68).

The AN 20 in the EVDO rA network, which is requested to release the resources in S68, releases the QoS resources allocated in S54 in response to the resource release request (S70).

According to the system and the method for releasing QoS resources in mobile communication network, if the mobile terminal allocated with the QoS resources from the PDSN through the EVDO rA network to receive data services escapes from the EVDO rA network, the mobile terminal may request the release of the QoS resources allocated to the mobile terminal from the PDSN through a second network, such as a CDMA 1x network. This may increase use efficiency of the QoS resources. Alternatively or in combination with this procedure, an AN in the EVDO rA network may monitor whether the mobile terminal uses allocated QoS resources, and if allocated QoS resources are not used, it may request the release of the allocated QoS resources from the PDSN.

According to these exemplary embodiments, if the mobile terminal that was allocated with the QoS resources escapes from the EVDO rA network while receiving the data service, there may be procedures or system components implemented in the mobile terminal, the access network, the text message server, or any combination thereof, for releasing the allocated QoS resources without requiring the mobile terminal to re-connect to the EVDO rA network. Thus, a process for releasing the QoS resources upon reconnection may not be needed, and waste of wireless resources may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for releasing quality of service (QoS) resources in a mobile communication network, comprising:
   a Packet Data Serving Node (PDSN) to allocate QoS resources to a mobile terminal after setting a session connection to the mobile terminal through a first network; and
   a text message server to receive a text message from the mobile terminal through a second network, the text message for requesting release of the QoS resources after the mobile terminal has escaped the first network, and to transmit QoS resource release information included in the text message to the PDSN,
   wherein the PDSN releases the QoS resource allocated to the mobile terminal through the first network on the basis of the QoS resource release information received from the text message server,
   wherein the QoS resource release information comprises 5-tuple (transmission address, reception address, transmission port, reception port, and next header information).

2. The system of claim 1, wherein the first network is an Evolution-Data Optimized (EVDO) Revision A (rA) network, and the second network is a code division multiple access (CDMA) 1x network.

3. A system for releasing quality of service (QoS) resources in a mobile communication network, comprising:
   a Packet Data Serving Node (PDSN) to allocate QoS resources to a mobile terminal after setting a first session connection to the mobile terminal through a first network; and
   the mobile terminal to request a second session connection to the PDSN through a second network, and to transmit QoS resource release information to the PDSN via the second network to request release of the allocated QoS resources,
   wherein, when the PDSN receives the QoS resource release information from the mobile terminal while performing the second session connection through the second network, the PDSN releases the QoS resources allocated to the mobile terminal through the first network,
   wherein the QoS resource release information comprises 5-tuple (transmission address, reception address, transmission port, reception port, and next header information).

4. The system of claim 3, wherein the first network is an Evolution-Data Optimized (EVDO) Revision A (rA) network, and the second network is a code division multiple access (CDMA) 1x network.

5. A system for releasing quality of service (QoS) resources in a mobile communication network, comprising:
   a Packet Data Serving Node (PDSN) to allocate QoS resources to a mobile terminal after setting a session connection to the mobile terminal through a first network; and
   an access network (AN) in the first network to check whether the QoS resources allocated to the mobile terminal are used, and if the QoS resources are not used for a first predetermined time, to request a connection release to the mobile terminal, to determine that the mobile terminal has moved from the first network if a response is not received in a second predetermined time, and to transmit QoS resource release information to the PDSN to request release of the QoS resources allocated to the mobile terminal,
   wherein, if the PDSN receives the QoS resource release information from the AN, the PDSN releases the QoS resources allocated to the mobile terminal through the first network.

6. The system of claim 5, wherein the first network is an Evolution-Data Optimized (EVDO) Revision A (rA) network, and the second network is a code division multiple access (CDMA) 1x network.

7. The system according to claim 5, wherein the QoS resource release information comprises 5-tuple (transmission address, reception address, transmission port, reception port, and next header information).

8. A method for releasing quality of service (QoS) resources in a mobile communication network, comprising:
   receiving a request for a session connection at a Packet Data Serving Node (PDSN) through a first network for data services, setting the session connection to a mobile terminal, and allocating QoS resources to the mobile terminal from the PDSN;
   receiving a text message at a text message server to request release of the allocated QoS resources, the text message sent by the mobile terminal through a second network if the mobile terminal escapes from the first network;
   at the text message server, extracting QoS resource release information from the text message, and transmitting the extracted QoS resource release information to the PDSN; and
   at the PDSN, releasing the QoS resources allocated to the mobile terminal through the first network,
   wherein the QoS resource release information comprises 5-tuple (transmission address, reception address, transmission port, reception port, and next header information).

9. The method of claim 8, wherein the first network is an Evolution-Data Optimized (EVDO) Revision A (rA) network, and the second network is a code division multiple access (CDMA) 1x network.

10. A method for releasing quality of service (QoS) resources in a mobile communication network, comprising:
    connecting to a first network, requesting a first session connection to a Packet Data Serving Node (PDSN) through the first network to receive data services, and receiving QoS resources allocated to a mobile terminal from the PDSN through the first network;
    if the mobile terminal escapes from the first network, requesting a second session connection to the PDSN through a second network to receive the data services through the second network; and providing QoS resource release information for requesting release of the QoS resources allocated to the mobile terminal in a session negotiation message and transmitting the session negotiation message to the PDSN through the second network, wherein the PDSN releases the QoS resources allocated to the mobile terminal upon receiving the QoS resource release information, wherein the QoS resource release information comprises 5-tuple (transmission address, reception address, transmission port, reception port, and next header information).

11. The method of claim 10, wherein the first network is an Evolution-Data Optimized (EVDO) Revision A (rA) network, and the second network is a code division multiple access (CDMA) 1x network.

12. The method of claim 10, wherein the PDSN releases the QoS resources allocated to the mobile terminal while performing the second session connection to the mobile terminal, if the QoS resource release information is included in the session negotiation message received from the mobile terminal.

13. A method for releasing quality of service (QoS) resources in a mobile communication network, comprising:
receiving a session connection request at a Packet Data Serving Node (PDSN) from a mobile terminal through a first network;
allocating QoS resources to the mobile terminal by the PDSN;
checking whether the QoS resources allocated to the mobile terminal are used;
if the QoS resources are not used for a first predetermined time, requesting a connection release to the mobile terminal;
if a response to the connection release request is not received from the mobile terminal within a second predetermined time, determining that the mobile terminal has escaped from the first network;
requesting the PDSN to release the QoS resources allocated to the mobile terminal through the first network by an access network (AN) of the first network; and
releasing the QoS resources allocated to the mobile terminal through the first network.

14. The method of claim 13, wherein the first network is an Evolution-Data Optimized (EVDO) Revision A (rA) network, and the second network is a code division multiple access (CDMA) 1x network.

15. A method for releasing quality of service (QoS) resources by a mobile terminal, comprising:
requesting a session connection to a Packet Data Serving Node (PDSN) through a first network;
receiving allocated QoS resources from the PDSN; and
if the mobile terminal escapes from the first network and connects to a second network, transmitting a text message for requesting a release of the allocated QoS resources to a text message server through the second network, the text message comprising QoS resource release information,
wherein the PDSN releases the QoS resources allocated to the mobile terminal through the first network upon receiving the QoS resource release information included in the text message,
wherein the QoS resource release information comprises 5-tuple (transmission address, reception address, transmission port, reception port, and next header information).

16. The method of claim 15, wherein the first network is an Evolution-Data Optimized (EVDO) Revision A (rA) network, and the second network is a code division multiple access (CDMA) 1x network.

17. The method of claim 15, wherein the text message server extracts the QoS resource release information from the text message, and transmits the extracted QoS resource release information to the PDSN.

18. A method for releasing quality of service (QoS) resources in a mobile communication network, comprising:
receiving a request for a first session connection to a Packet Data Serving Node (PDSN) from a mobile terminal through a first network;
allocating QoS resources to the mobile terminal by the PDSN;
receiving a request for a second session connection to a Packet Data Serving Node (PDSN) and a session negotiation message comprising QoS resource release information for requesting release of the QoS resources allocated to the mobile terminal, the request for the second session connection and the session negotiation message received by the PDSN through a second network; and
releasing the QoS resources allocated to the mobile terminal upon receiving the QoS resource release information while performing the second session connection to the mobile terminal,
wherein the QoS resource release information comprises 5-tuple (transmission address, reception address, transmission port, reception port, and next header information).

19. The method of claim 18, wherein the first network is an Evolution-Data Optimized (EVDO) Revision A (rA) network, and the second network is a code division multiple access (CDMA) 1x network.

* * * * *